United States Patent [19]

Victor

[11] 4,425,807
[45] Jan. 17, 1984

[54] FLOW MEASURING DEVICE WITH CONSTANT FLOW COEFFICIENT

[76] Inventor: Michael Victor, 28761 Maplewood, Garden City, Mich. 48135

[21] Appl. No.: 347,957

[22] Filed: Feb. 11, 1982

[51] Int. Cl.³ .............................................. G01F 1/46
[52] U.S. Cl. .............................. 73/861.65; 73/861.66
[58] Field of Search ................. 73/861.66, 861.65, 182

[56] References Cited

U.S. PATENT DOCUMENTS

| | | | |
|---|---|---|---|
| 3,751,982 | 8/1973 | Lambert | 73/861.66 |
| 3,765,241 | 10/1973 | Lambert | 73/861.66 |
| 4,343,195 | 8/1982 | Victor et al. | 73/861.66 |

Primary Examiner—Charles A. Ruehl
Assistant Examiner—Brian Tumm
Attorney, Agent, or Firm—Charles W. Chandler

[57] ABSTRACT

A flow-sensing probe adapted to be mounted in a conduit for indicating the flow rate of a fluid passing through the conduit. The probe has forward openings facing in the direction of fluid flow, and rear openings disposed at an angle of about one hundred and ten degrees with respect to the forward openings. Pressures sensed by the forward and rear openings are used to indicate volumetric flow by using a flow coefficient that is independent of Reynold's number.

9 Claims, 7 Drawing Figures

FLOW MEASURING DEVICE WITH CONSTANT FLOW COEFFICIENT

BACKGROUND OF THE INVENTION

This invention is related to flow sensing probes or pitot tubes adapted to sense both a dynamic pressure and a static pressure through a series of openings, and more particularly to a probe having a circular exterior cross-section and rear openings disposed at an angle of about one hundred and ten degrees rearwardly of the forward openings.

Pitot tubes are commonly used for measuring fluid flow. Conventional flow-sensing tubes have a series of forward openings facing toward the direction of flow for measuring dynamic pressure, and a rear series of openings for measuring a lesser or static pressure, to determine flow rates at various flow velocities. Round tubes have the rear openings disposed at an angle of one hundred and eighty degrees with respect to the forward openings. The two pressures are sensed in a pair of internal chambers which in turn communicate with a measuring device.

The problem with conventional flow-sensing tubes is that the fluid pressure varies as it passes around the tube. The pressure differential varies through the range of normal fluid velocities. Two types of calculations are usually required to determine a flow rate. The first calculation is derived from flow tests conducted to determine the actual performance of the device compared to the theoretical. This relationship is expressed as a flow coefficient.

Usually the flow coefficient for prior art devices varies with changes in flow rate. Thus a separate calculation must be made for each flow rate to determine the coefficient for that flow rate.

Attempts have been made in the prior art to provide a more accurate means for sensing fluid pressures in order to compute volumetric flow rate. For example, Lambert U.S. Pat. No. 3,751,982 discloses a pair of rearwardly extending walls carried on the pitot tube to influence the air pressure as it passes around the tube. Other devices of the prior art place the rear openings at a ninety degree angle with respect to the forward openings. Some commercial applications employ a tube having a diamond-shaped cross section to improve the accuracy of the pressure reading.

SUMMARY OF THE INVENTION

The broad purpose of the present invention is to provide a pitot tube having a round exterior cross section for sensing pressure in which the rear openings are disposed at an angle of about one hundred and ten degrees rearward of the forward openings. Preferably there are two rear openings for each forward opening. It has been found that locating the rear holes at a particular angle provides a substantially constant flow coefficient throughout the normal usable range of fluid velocities, that is a flow coefficient that is independent of the conduit's Reynold's number.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
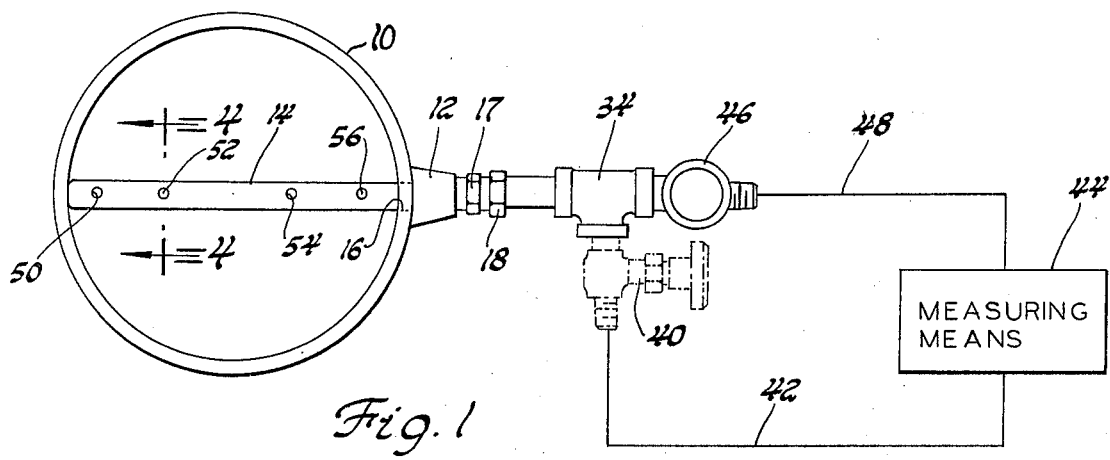
FIG. 1 is a sectional view of a flow sensing tube mounted in a conduit for measuring fluid flow in accordance with the present invention, parts of the Figure being illustrated schematically.

Referring to the drawings, FIG. 1 illustrates a cross section of a conduit 10 for delivering a fluid such as a gas. An internally threaded collar 12 is welded to one side of the conduit. A flow-sensing tube 14 is received in the collar through opening 16 so as to extend into the conduit transversely to fluid flow therein. A pair of nuts 17 and 18 lock and seal the flow sensing tube in position.

Figure 2:
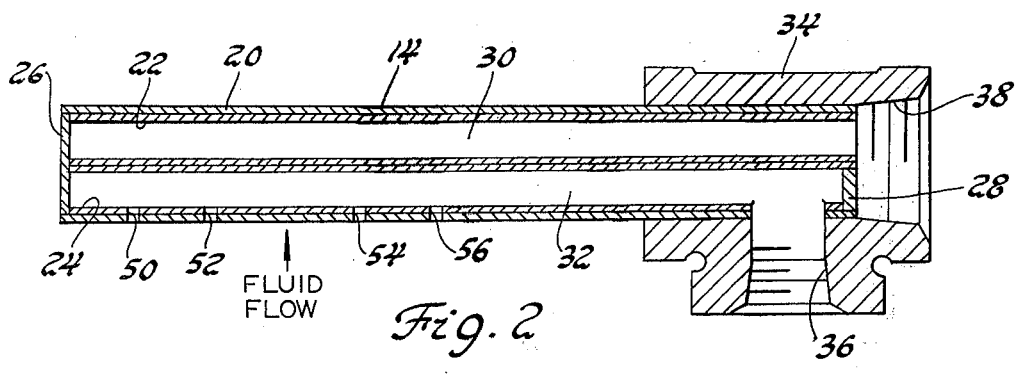
FIG. 2 is a longitudinal sectional view through the pitot tube of FIG. 1.
Figure 4:
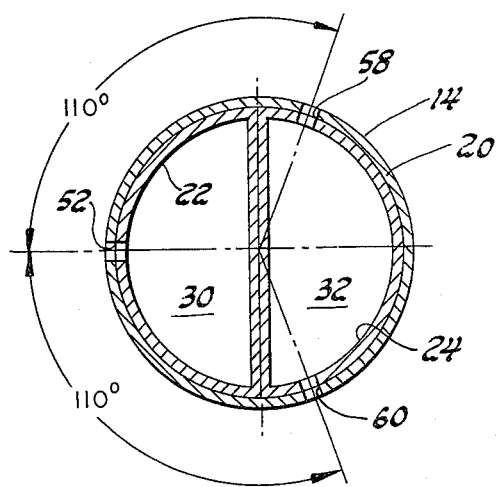
FIG. 4 is an enlarged view as seen along lines 4—4 of FIG. 1.

FIGS. 2 and 4 illustrate the internal structure of flow sensing tube 14. Tube 14 has a tubular housing 20 having a circular cross-section. A pair of D-shaped tubes 22 and 24 are disposed back-to-back in housing 20. A plug 26 blocks one end of housing 20, and a plug 28 blocks the opposite end of tube 24. The arrangement is such as to form a pair of D-shaped internal chambers 30 and 32.

A T-shaped conduit 34 is mounted on the end of housing 14. Conduit 34 has a threaded opening 36 in communication with chamber 32, and a threaded opening 38 in communication with chamber 30.

Referring to FIG. 1, in use, a valve 40 is mounted on conduit 34 and connected by conduit means 42 to measuring means 44 which senses the pressure in chamber 32 through opening 36. A second valve 46 is mounted on conduit 34 and connected by conduit means 48 to measuring means 44 for sensing the pressure in chamber 30 through opening 38. Measuring means 44 is adapted to compute the volumetric flow rate through the conduit 10 depending upon the relationship between the pressures in chambers 30 and 32.

Housing 14 and tube 24 have forward openings 50, 52, 54 and 56 supported to face in the direction of fluid flow in conduit 10. The flow sensing tube has a pair of openings 58 and 60 disposed rearwardly of each forward opening, as illustrated in FIG. 4. Opening 58 is preferrably formed one hundred and ten degrees rearwardly of the radial axis of forward opening 52, while opening 60 is formed on a radial axis that is one hundred and ten degrees rearwardly of the axis of opening 52, but in the opposite direction with respect to opening 58.

Both openings 58 and 60 extend through housing 20 and tube 24 to fluidly communicate with chamber 32.

Forming rear openings 58 and 60 within an angular range greater than 105 degrees but less than 115 degrees provides means for sensing the fluid pressure around tube 14 such that the flow coefficient remains constant regardless of the Reynold's number related to the fluid velocity passing through conduit 10. Preferably there are two rear openings for each forward opening. In addition the combined cross sectional area of the forward openings is less than the transverse cross section of chamber 30, while the combined cross section of the rear openings is less than the transverse cross section of chamber 32.

Figure 6:
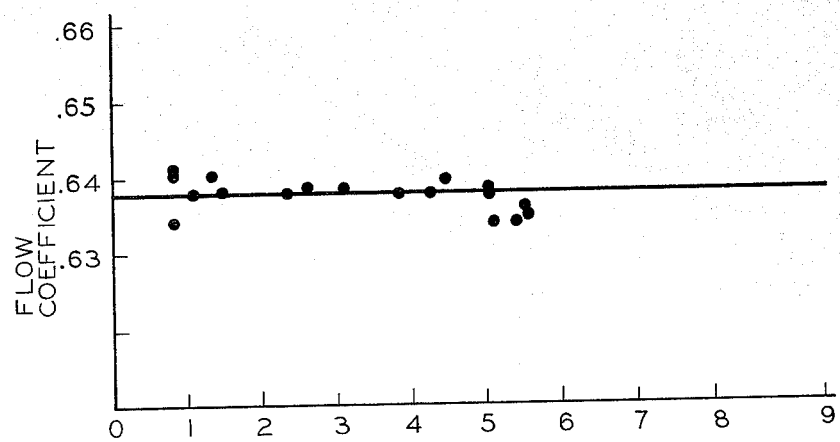
FIG. 6 is a chart showing the linear relationship between the flow coefficient and the Reynold's number of a flow sensing tube illustrating the preferred embodiment of the invention.

FIG. 6 illustrates the linear relationship between the flow coefficient and the Reynold's number of a fluid passing through a four inch pipe employing a flow-sensing tube of the type illustrated in FIG. 1. It shows that the coefficient was essentially constant though the average velocity of the fluid in the conduit ranged from 1.4 ft. per second to over 22 ft. per second. Thus the coefficient is essentially independent of the Reynold's number and the fluid velocity. The coefficient does not shift with the Reynold's number as is common using other commercially available flow sensing tubes.

Figure 7:
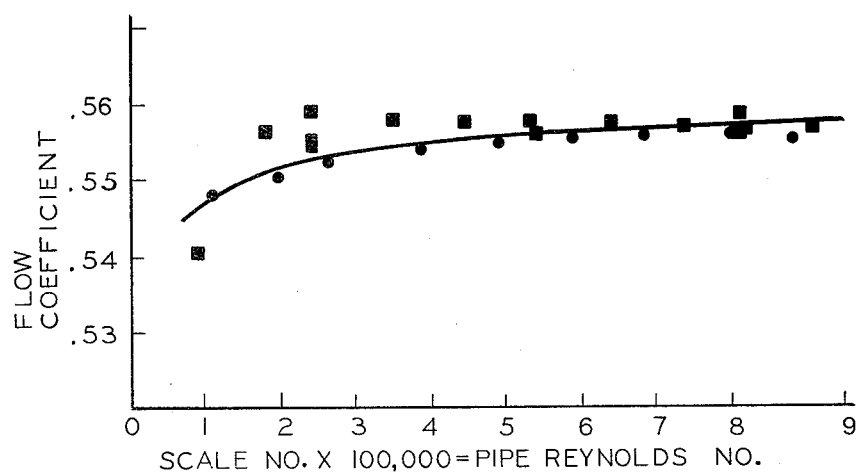
FIG. 7 is a chart illustrating the non-linear relationship between the flow coefficient and the Reynold's number of a commercially available flow-sensing tube in which the rear holes are one hundred and eighty degrees rearward of the forward holes.

FIG. 7 illustrates the manner in which the flow coefficient varies with the Reynold's number for a commercially available tube having a diamond-shaped cross section having rear openings 180 degrees rearward of the forward openings.

Figure 3:
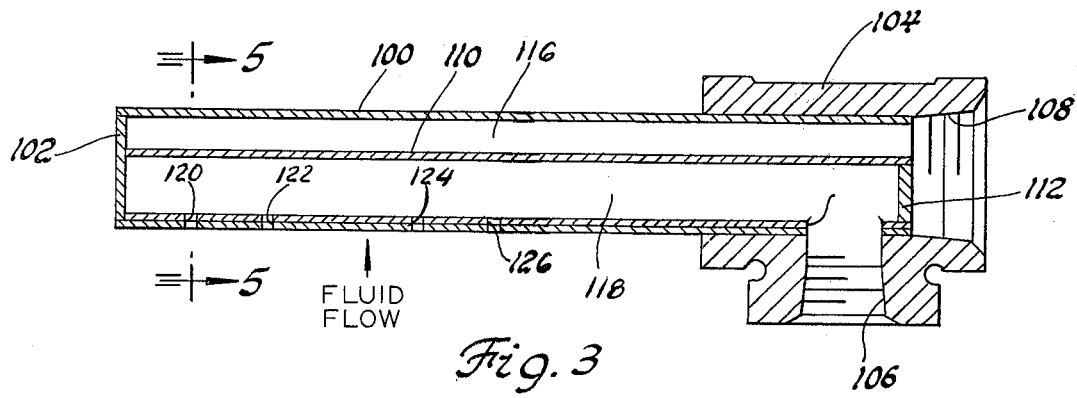
FIG. 3 is a longitudinal sectional view through another pitot tube embodying the invention.
Figure 5:
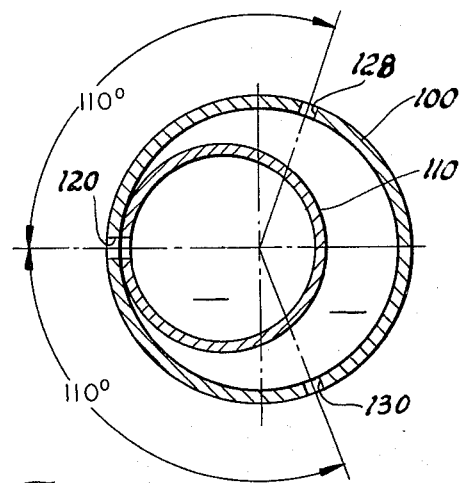
FIG. 5 is an enlarged view as seen along lines 5—5 of FIG. 3 but rotated ninety degrees in the counterclockwise direction.

FIGS. 3 and 5 illustrate another embodiment of the invention in which tubular housing 100 has one end closed with plug 102. The other end is mounted in a T-shaped conduit 104 having a pair of threaded outlets 106 and 108. A smaller inner tube 110 is mounted in housing 100 and extends substantially the full length of the housing. Plug 102 blocks one end of tube 110 while a plug 112 blocks its opposite end. A chamber 116 between tube 100 and tube 110 fluidly communicates through outlet 108 to a suitable measuring means. A second chamber 118 within tube 110 fluidly communicates to the measuring means through outlet 106. As illustrated in FIG. 5, the internal cross section of chamber 118 is preferably equal to the cross section of chamber 116.

Housing 100 has flow sensing openings 120, 122, 124 and 126 communicating with chamber 118 and adapted to face toward the direction of fluid flow in the conduit, as illustrated in FIG. 3.

Referring to FIG. 5, the flow sensing tube has a pair of openings 128 and 130 formed rearwardly of opening 120. Opening 128 is formed on a radial axis that is 110 degrees rearward of the radial axis of opening 120, while opening 130 is formed on a radial axis 110 degrees rearward of the radial axis of opening 120. The flow-sensing tube has a similar pair of rearward openings for each of forward openings 122, 124 and 126. In this embodiment of the invention the combined cross section area of the forward openings is less than the internal transverse cross section of chamber 118, while the combined cross sectional areas of the rearward openings is less than the cross sectional area of chamber 116.

It is apparent that flow sensing tubes having other wall configurations forming a pair of internal chambers can be employed, provided the cross section of the outer housing is circular and the rear openings are within the range of 105 degrees to 115 degrees rearwardly of the forward openings.

Having described my invention, I claim:

1. A flow-sensing tube means supported transversely to fluid flowing in a conduit for measuring differential flow pressure, comprising:
   a hollow, elongated tubular member having a circular exterior cross section;
   wall means in said tubular member forming a first chamber and a second chamber;
   first flow-sensing opening means through the wall of said tubular member facing in a first radial direction and fluidly connected to the first chamber;
   second flow-sensing opening means through the wall of the tubular member facing a second radial direction and fluidly connected to the second chamber, the second opening means being formed on a radial axis forming an angle greater than 105 degrees but less than 115 degrees with respect to a radial axis passing through the first opening means;
   means for mounting the tubular member in the conduit in the path of fluid flow with the first opening means facing the flow of fluid; and
   means fluidly connecting each of said chambers to a measuring means.

2. A combination as defined in claim 1, in which the radial axis passing through the second opening means is disposed at an angle of about 110 degrees rearward of the radial axis passing through the first opening means.

3. A combination as defined in claim 1, including third opening means fluidly connected to the second chamber, the third opening means being formed in the tubular wall about a radial axis forming an angle greater than 105 degrees, but less than 115 degrees with respect to the radial axis passing through the first opening means.

4. A combination as defined in claim 3, in which the third opening means are disposed at an angle of about 110 degrees with respect to the first opening means, but in the opposite direction with respect to the second opening means.

5. A combination as defined in claim 1, in which the first opening means comprises a plurality of openings having a combined cross sectional area less than the transverse cross sectional area of the first chamber, and the sum of the cross sectional areas of the second opening means is less than the transverse cross sectional area of the second chamber.

6. A combination as defined in claim 1, in which the wall means in the tube form a pair of D-shaped chambers disposed back-to-back.

7. A combination as defined in claim 1, including a pair of D-shaped tubes disposed in the tubular member, said D-shaped tubes being disposed back-to-back to form said first chamber and said second chamber.

8. A combination as defined in claim 1, in which the wall means comprises an inner elongated substantially circular tube disposed in the first mentioned tubular member, the inner tube forming said first chamber.

9. A flow-sensing tube adapted to be supported transversely to fluid flowing in a conduit for measuring differential flow pressure, comprising:
   a hollow, elongated tubular member having an exterior circular cross section;
   wall means in said tubular member forming a first chamber and a second chamber;
   first flow-sensing opening means through the wall of said tubular member facing in a first radial direction and fluidly connected to the first chamber;

second flow-sensing opening means through the wall of the tubular member facing a second radial direction and fluidly connected to the second chamber, the second opening means being formed on a radial axis forming an angle between 105 and 115 degrees rearwardly of the forward opening means such that when the tube is disposed in a conduit in the path of fluid flow with the first opening means facing the flow of fluid, measuring connected to the first chamber and the second chamber are operative to compute the volumetric flow in the conduit employing a flow coefficient that is substantially independent of the Reynold's number of the conduit.

* * * * *